United States Patent [19]

Richardson

[11] Patent Number: 4,878,616
[45] Date of Patent: Nov. 7, 1989

[54] SPRAY BOOM HEIGHT ADJUSTMENT

[76] Inventor: Delmar J. Richardson, 2262 Portage Ave., Winnipeg, Manitoba, Canada

[21] Appl. No.: 207,490
[22] Filed: Jun. 16, 1988
[51] Int. Cl.⁴ .............................................. B05B 1/20
[52] U.S. Cl. ................................................ 239/167
[58] Field of Search ............... 239/164, 166, 167, 168, 239/146, 661, 6

[56] References Cited

U.S. PATENT DOCUMENTS

| | | | |
|---|---|---|---|
| 1,043,929 | 11/1912 | Heard | 239/167 |
| 2,496,874 | 2/1950 | Holopainen . | |
| 2,613,584 | 10/1952 | Zoland . | |
| 2,682,153 | 6/1954 | Fink . | |
| 2,793,909 | 5/1957 | Gerbracht | 239/167 X |
| 2,879,787 | 3/1959 | Ingram . | |
| 3,065,803 | 11/1962 | Pierson . | |
| 3,135,339 | 6/1964 | Fry et al. . | |
| 3,448,927 | 6/1969 | Blair . | |
| 3,543,864 | 12/1970 | Wenzel et al. | 172/285 |
| 3,856,038 | 12/1974 | Paul | 137/344 |
| 3,866,834 | 2/1975 | Shannon | 239/167 |
| 3,943,966 | 3/1976 | Boone | 137/344 |
| 4,026,365 | 5/1977 | Anderson et al. | 172/386 |
| 4,039,147 | 8/1977 | Hugg | 239/167 |
| 4,054,185 | 10/1977 | Stedman | 187/9 |
| 4,083,411 | 4/1978 | van der Lely | 172/59 |
| 4,317,489 | 3/1982 | Steinbach | 172/400 |
| 4,392,996 | 6/1978 | Kock | 137/344 |
| 4,441,655 | 4/1984 | Blumhardt | 239/167 X |
| 4,709,857 | 12/1987 | Wilger | 239/167 |
| 4,746,065 | 5/1988 | Gorder | 239/168 X |

FOREIGN PATENT DOCUMENTS 2102661  2/1983  United Kingdom ............... 239/164

Primary Examiner—Andres Kashnikow
Assistant Examiner—Kevin P. Weldon
Attorney, Agent, or Firm—Larson and Taylor

[57] ABSTRACT

A spray boom assembly has an elongate boom carrier supported on walking beams near its opposite ends. Each of the walking beams consists of a pair of parallelogram linkages extending respectively to the front and back of the boom carrier. The parallelogram linkages are linked by an hydraulic cylinder or actuator that can be extended to rotate the parallelogram linkages downwards about their pivotal connections to the boom carrier. This raises the boom carrier without changing its orientation.

14 Claims, 3 Drawing Sheets

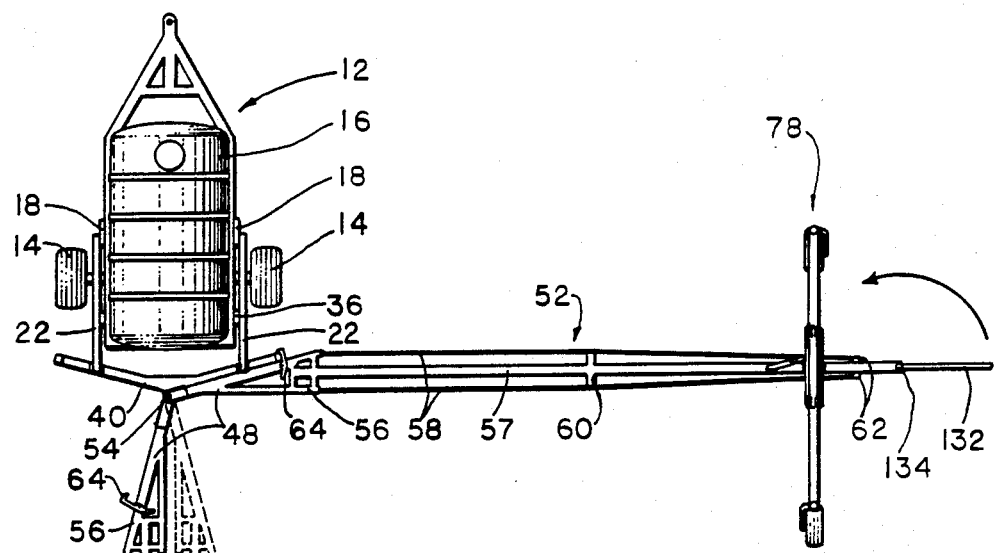
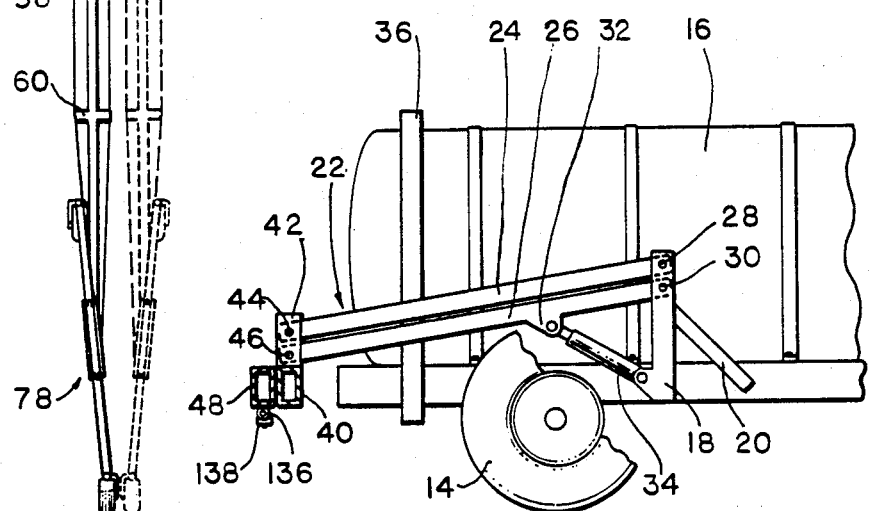
FIG. 2
FIG. 3 ical sprayers, for example agricultural spray-

SPRAY BOOM HEIGHT ADJUSTMENT

FIELD OF THE INVENTION

The present invention relates to spray boom assemblies adapted to be carried by a vehicle, either self-propelled or towed.

BACKGROUND

In chemical sprayers, for example agricultural sprayers, relatively long spray booms extend outwardly on each side of the centre of a trailer or other vehicle. The booms carry spaced spray nozzles and chemical supply lines connecting them to a pump that is carried on the vehicle together with all the necessary conventional equipment to eject liquid from the spray nozzles.

Conventionally, height adjustment is by rotating the boom carrier, which raises and lowers the spray boom in an arc. The main disadvantages of this arrangement are that as the spray boom is raised and lowered, the orientation of the spray nozzles changes, and that the maximum height is limited by the length of the arms extending between the spray boom and the boom carrier. The present invention aims at the amelioration of these disadvantages.

SUMMARY

According to the present invention there is provided an elongate spray boom assembly having an elongate boom carrier, a plurality of walking beams pivotally mounted on the boom carrier, and ground wheels mounted on the walking beams, wherein each walking beam comprises a pair of parallelogram linkages extending to front and back sides respectively of the boom carrier, each linkage having two broom pivots mounted on the boom carrier and to wheel pivots mounting on a wheel support, and actuating means for pivoting the parallelogram linkages to adjust the height of the boom carrier with respect to the wheels.

With the parallelogram linkage arrangement, the boom carrier may be raised and lowered without a change in its orientation. A wide range of carrier heights can be achieved because the parallelogram linkages that constitute the walking beams allow the raising of the boom carrier to a considerable height above the ground. In the known systems, the fixed boom carrier height is a limiting factor determining the maximum height of crop that can be sprayed.

In the preferred embodiments of the invention, the boom assembly includes a carrier support mounted on a towing vehicle with a further parallelogram linkage mechanism. The carrier is made in two sections, pivoted to the central support, so that the two sections can swing rearwardly to a transport position behind the towing vehicle or sideways to a spraying position. Appropriate latches retain the boom parts in the spraying position.

BRIEF DESCRIPTION OF THE DRAWINGS

In the accompanying drawings, which illustrate an exemplary embodiment of the present invention:

FIG. 2 is a view like FIG. 1 on a smaller scale, showing the complete boom assembly;

FIG. 3 is a side elevation of the mechanism for mounting the boom support on the towin vehicle;

DETAILED DESCRIPTION

Figure 1:
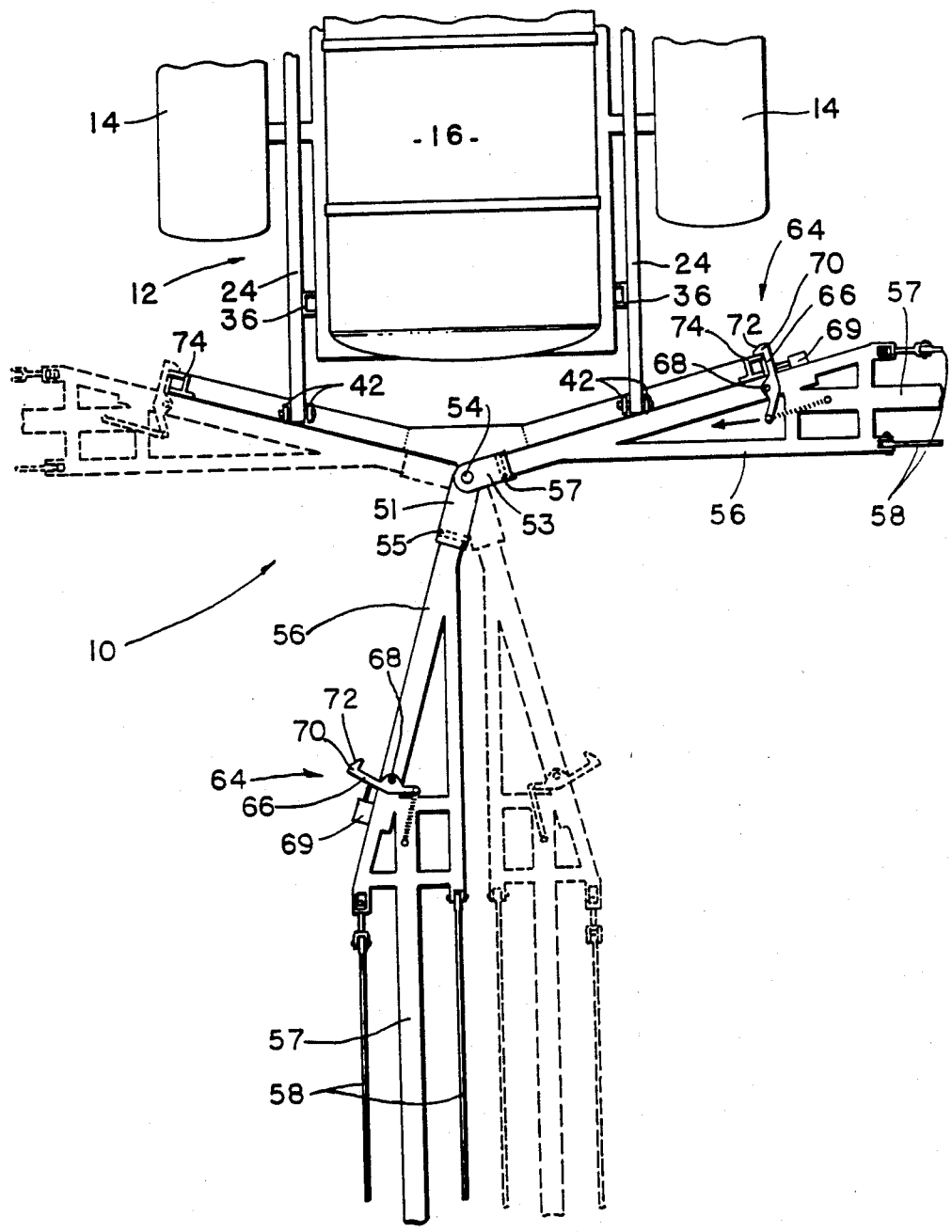
FIG. 1 is a partial plan view showing the mounting of a spray boom assembly on a towing vehicle.

Referring to the accompanying drawings, and especially to FIGS. 1, 2 and 3, there is illustrated a sprayer 10 including a towing vehicle 12 mounted on two wheels 14. The towing vehicle carries a chemical tank 16 and all of the other necessary equipment including pumps and the like for operating the sprayer. As illustrated most particularly in FIGS. 2 and 3, the towing vehicle is equipped with two standards 18, one on each side, and each secured in place with a brace 20. Each standard 18 carries a parallelogram linkage 22 projecting beyond the rear of the vehicle 12. The linkage included an upper arm 24 and a lower arm 26 mounted on the standard 18 by parallel pivots 28 and 30. The lower arm 26 carries a lug 32 that is connected to an hydraulic cylinder 34 also connected to the standard 18 below the pivots 30. Inside each parallelogram linkage, between the standard 18 and the rear end of the towing vehicle 12 is a vertical channel 36 that serves as a wear plate limiting lateral deflection of the arms 24 and 26.

The rear ends of the arms 24 and 26 are connected to a boom carrier support 40. Each linkage 22 has its arms connected between an associated pair of vertical lugs 42 by respective pivots 44 and 46. The boom carrier support is, as illustrated in FIG. 1, slightly V-shaped, converging towards an apex at the rear.

A boom carrier 48 is mounted on the carrier support 40. The carrier includes a left section 50 and a right section 52 as most clearly illustrated in FIG. 2. The two sections are mounted on the carrier support 40 with a common vertical pivot 54 by respective yokes 51 and 53 that are coupled to the supports. The carrier sections 50 and 52 are in turn pivotally connected to the yokes 51 and 53 by horizontal pivot pins 55 and 57. This allows independent movement of the boom sections in both spraying and transport conditions. The ends of the carrier sections adjacent the yokes 51 and 53 are constructed as triangular trusses 56, each carrying an elongate rectangular beam 57. The beam is itself trussed by two cables 58 connected to the truss 56 and extending along the beam 57, over respective ones of two short struts 60 and dead ending at 62 near the end of the beam 57.

The boom carrier sections 50 and 52 pivot between transport and spraying positions. The left section 50 is shown in the transport position in full line in FIGS. 1 and 2 and in the spraying position in FI. 1 in broken line. Conversely, the right section 52 is illustrated in solid line in FIGS. 1 and 2 in the spraying position and in broken line in those Figures in the transport position. In normal practice, the two boom sections will be in the same position at the same time.

To retain the boom carrier sections in the spraying position, each is provided with a latch 64 consisting of an arm 66 mounted on the carrier section by a pivot 68. A lip 70 is formed on one end of the arm with a cam face 72 for engaging and camming the lip over a striker 74 mounted on the carrier mount 40. The arm 66 is biased to the latched position as illustrated on the right hand side in FIGS. 1 and 2. The two latches are released by drawing the ends of the arms 66 towards the lips 70 out of engagement with the striker with an hydraulic cylinder 69. This can also be done in any other suitable way, for example, with a cable, an electric actuator or, where desired, manually.

The outer ends of the boom carrier 48 are supported on walking beams 78. Their construction and operation is illustrated most particularly in FIGS. 2, 4 and 5. Each beam includes a base 80 that is clamped to the boom carrier 48 by a clamp 82. The clamp is adjustable along the carrier 48 so that the spacing between the walking beams and of a walking beam from the towing vehicle may be adjusted as desired.

The walking beam base 80 carries a pivot mechanism with a vertical axis. This is illustrated in broken line in FIG. 4. Mounted on the pivot 84 are two parallel, vertically arranged plates 86 which project to opposite sides of the boom carrier 48. On one side, the plates carry one end of a parallelogram linkage 88 which includes an upper arm 90 and a lower arm 92 connected between the plates 86 by a pair of parallel, horizontal pivots 94 and 96 respectively. At the other end of the parallelogram linkage 88 is a wheel support 98 which includes a channel connected over the ends of the arms 90 and 92 by parallel pivots 100 and 102 respectively. The wheel support carries a caster wheel 104.

The upper arm 90 of the parallelogram linkage 88 carries a pair of vertically extending lugs 106 near the plates 86.

On the opposite side of the boom carrier 48, the pivot 84 carries a second parallelogram linkage 108 consisting of an upper arm 110 and a lower arm 112 connected between the plates 86 by parallel pivots 114 and 116. A wheel support 118 is connected to the outer ends of the arms 110 and 112 by pivots 120 and 122 respectively. The wheel support 118 carries a caster wheel 124. Like arm 90, arm 110 carries lugs 126 that project vertically from the arm adjacent the plates 86.

Figure 4:
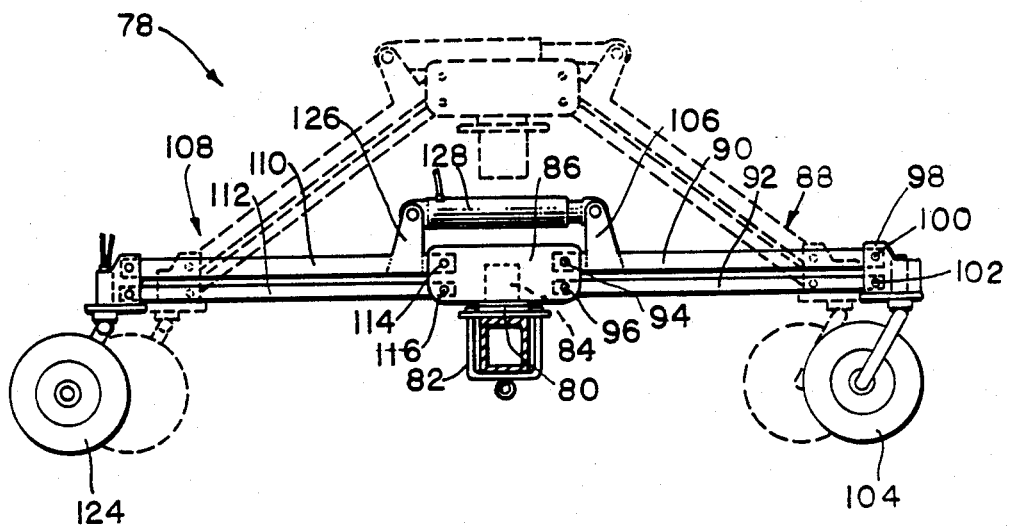
FIG. 4 is a elevation, partially in section of a walking beam attached to a boom carrier.
Figure 5:
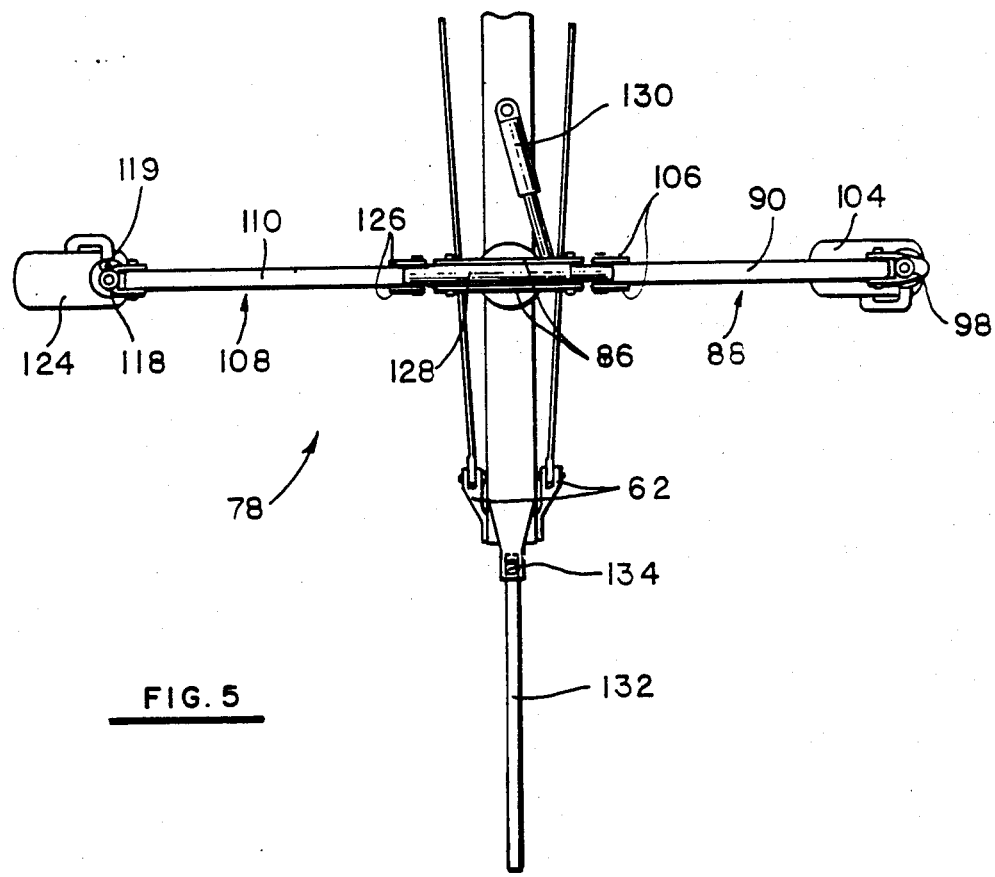
FIG. 5 is a plan view of the walking beam of FIG. 4.

To control the parallelogram linkages, an hydraulic cylinder 128 extends between the lugs 106 and the lugs 126. As illustrated in FIGS. 4 and 5, the cylinder is fully contracted and the two parallelogram linkages are approximately horizontal. If the sprayer is travelling to the right as illustrated in FIG. 4 and the leading caster wheel 104 passes over a rise in the ground level, this will elevate the wheel 104 through a pivoting movement of the parallelogram linkage 88. The resultant movement of the lugs 106 will act through the cylinder 128 on the lugs 126 to produce an opposite downwards movement of the parallelogram linkage 128 and its caster wheel 124. The reverse movement occurs when the wheel 104 enters a depression. The walking beam is likewise responsive to movements of the caster wheel 124.

To elevate the boom carrier, the cylinder 128 is extended as shown in broken line in FIG. 4. This pivots the parallelogram linkages 88 and 108 downwards about their pivotal connections to the plates 86. This raises the boom carrier 48 through its clamped connection to the walking axle. A similar movement is carried out at the centre of the boom carrier, where the cylinders 34 on opposite sides of the trailer are extended to raise the parallelogram linkages 22.

Through the use of parallelogram linkages in the walking beam and for mounting the centre of the boom carrier to the towing vehicle, the orientation of the boom carrier remains constant, despite the wide variation in the height of the carrier. In one embodiment of the invention the boom height can be adjusted from 14 inches (about 36 cm) to 62 inches (about 143 cm) from the ground. Any height between those limits can be used in operation.

To control the movement of the walking beam around the vertical pivot 84, there is an hydraulic cylinder 130 connected at one end to the boom carrier and at the other to the walking beam at a position spaced from the pivot 84. This allows the walking beams to be swung to a position generally in line with the boom carrier when the boom carrier is in the transport position illustrated most particularly in FIG. 2. The direction of pivotal movement of the walking beams is such that the leading end of the walking beam is outside the boom carrier in the transport position, while the trailing end is inside the carrier. For transport purposes, the wheel support 118 at the trailing end has a spring-extended, pressure retracted hydraulic cylinder 119 that engages in a latch opening in the caster wheel courier to lock the wheel against rotation out of the transport position. When the cylinder 119 is actuated, the piston rod is retracted allowing free caster movement of the wheel. When pressure is removed from the cylinder, the piston rod is spring brossed to the locking position and will automatically extend to lock the wheel against steering rotation when the wheel turns into the transport position.

To shift from the spraying position to the transport position, it is only necessary to actuate the cylinders 69, the cylinders 119 and the cylinders 130 and drive the towing vehicle forward simultaneously. The small cylinders 69 and 119 react immediately to unlock the boom carrier sections and to release the latching pistons of the rear casters. The larger cylinders 130 act more slowly to swing the walking beams inwards. This automatically brings the sprayer to the transport condition. The reverse movement from transport to the spraying position is accomplished by backing up the towing vehicle until the latches 64 engage the sprocket 74.

The outermost ends of the boom carrier are pivotally mounted swing away tips 132. These are connected to the remainder of the boom carrier by a hinge 134 with an inwardly and downwardly inclined axis so that gravitational forces on the tips cause them to adopt positions aligned with the carrier. If a tip encounters an obstacle during spraying, it will simply swing away without damage and return to its at rest position when the obstacle is cleared.

The boom spray pipe is mounted directly on the bottom of the boom carrier 48. It has appropriately spaced nozzles 138 mounted on it. Thus, the orientation of the nozzles remains constant regardless of the height of the boom carrier.

While one embodiment of the invention has been described in the foregoing, it is to be understood that other embodiments are possible within the scope of the invention. For example, the closed end of cylinder 128 may be equipped with a centering rod and a concentric coil spring that acts between the cylinder and a yoke pinned to the lugs 126. The rod passes slidably through the base of the yoke and is equipped with a retainer clip on the side opposite the cylinder. This provides the walking axles with a spring suspension. Other changes will readily occur to those skilled in the art.

Thus, the invention is to be construed as limited solely by the scope of the appended claims.

I claim:

1. An elongate spray boom assembly having an elongate boom carrier, a plurality of walking beams pivotally mounted on the boom carrier, and ground wheels mounted on the walking beams, wherein each walking beam comprises a pair of parallelogram linkages extending to front and back sides respectively of the boom carrier, each linkage having two boom pivots mounted on the boom carrier and two wheel pivots mounted on a wheel support, and actuating means for pivoting the parallelogram linkages to adjust the height of the boom carrier with respect to the wheels.

2. An assembly according to claim 1 including carrier support means for mounting the boom carrier on a towing vehicle and adjustment means for adjusting the carrier support means to vary the height of the boom carrier on the towing vehicle.

3. An assembly according to claim 2 wherein the carrier support means comprise a pair of parallelogram linkages, each having two pivots fixed on the towing vehicle and two pivots fixed on the boom carrier support, and means for pivoting the parallelogram linkages to adjust the height of the boom carrier support without altering its orientation.

4. An assembly according to claim 1 wherein the actuating means include an hydraulic cylinder linking the parallelogram linkages of each walking beam and control means for controllably extending and retracting the hydraulic cylinder.

5. An assembly according to claim 1 wherein each walking beam includes a support mounted on the boom carrier for rotation about a vertical axis, the boom pivots of the parallelogram linkages being carried on the support.

6. An assembly according to claim 5 including power operated means for selectively rotating each walking beam about the associated vertical axis.

7. An assembly according to claim 6 including means mounting the support on the boom carrier for adjustable positioning therealong.

8. An assembly according to claim 6 wherein the boom comprises two symmetrical parts, mounted on a central support means for rotation about a substantially vertical axis between a transport position with the boom parts projecting to the rear of the support means and a spraying position with the boom parts projecting laterally from the support means.

9. An assembly according to claim 8 including latch means for retaining each boom part in the spraying position.

10. An assembly according to claim 8 wherein, in the transport position of the two boom parts, the walking beams converge towards the rear, with the forward positioned wheels on the outside of the boom parts.

11. An assembly according to claim 10 wherein said ground wheels are casters.

12. An assembly according to claim 11 including locking means for locking the rearward wheels against rotation about their vertical axes when in the transport position.

13. An assembly according to claim 4 including resilient suspension means for each walking beam.

14. An assembly according to claim 13 wherein the resilient suspension means comprise a spring connected in series with the hydraulic cylinder between the parallelogram linkages.

* * * * *